(12) United States Patent
Wu et al.

(10) Patent No.: US 10,791,009 B1
(45) Date of Patent: Sep. 29, 2020

(54) CONTINUOUS TIME LINEAR EQUALIZATION (CTLE) ADAPTATION ALGORITHM ENABLING BAUD-RATE CLOCK DATA RECOVERY(CDR) LOCKED TO CENTER OF EYE

(71) Applicant: Xilinx, Inc., San Jose, CA (US)

(72) Inventors: Zhaoyin D. Wu, San Jose, CA (US); Parag Upadhyaya, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/682,806

(22) Filed: Nov. 13, 2019

(51) Int. Cl.
*H04L 25/03* (2006.01)
*H04L 27/01* (2006.01)
*H04L 27/00* (2006.01)
*H04L 7/00* (2006.01)

(52) U.S. Cl.
CPC ...... *H04L 25/03878* (2013.01); *H04L 7/0058* (2013.01); *H04L 27/0014* (2013.01); *H04L 27/01* (2013.01); *H04L 2027/0036* (2013.01)

(58) Field of Classification Search
CPC ......... H04L 25/03057; H04L 25/03273; H04L 7/033
See application file for complete search history.

(56) References Cited

U.S. PATENT DOCUMENTS

| | | |
|---|---|---|
| 7,127,022 B1 | 10/2006 | Dieguez |
| 8,559,580 B2 | 10/2013 | Dai et al. |
| 8,917,803 B1 | 12/2014 | Asuncion et al. |
| 9,049,075 B2 | 6/2015 | Juenemann et al. |
| 9,313,017 B1 | 4/2016 | Liao et al. |
| 9,356,775 B1 | 5/2016 | Xu et al. |
| 9,413,524 B1 | 8/2016 | Xu et al. |
| 9,438,409 B1 | 9/2016 | Liao et al. |
| 9,455,848 B1 | 9/2016 | Zhang et al. |

(Continued)

OTHER PUBLICATIONS

Yohan Frans, Mohamed Elzeftawi, Hiva Hedayati, Jay Im, Vassili Kireev, Toan Pham, Jaewook Shin, Parag Upadhyaya, Lei Zhou, Santiago Asuncion, Chris Borrelli, Geoff Zhang, Hongtao Zhang, Ken Chang, A 56Gb/s PAM4 Wireline Transceiver using a 32-way Time-Interleaved SAR ADC in 16nm FinFET, 2016 Symposium on VLSI Circuits Digest of Technical Papers, 2 pages, 2016.

(Continued)

*Primary Examiner* — Kevin Kim
(74) *Attorney, Agent, or Firm* — Patterson + Sheridan, LLP

(57) ABSTRACT

Apparatus and associated methods relate to adapting a continuous time linear equalization circuit with minimum mean square error baud-rate clock and data recovery circuit to be able to lock to the center or near center of an eye diagram. In an illustrative example, a circuit may include an inter-symbol interference (ISI) detector configured to receive data and error samples, a summing circuit coupled to the output of the ISI detector, a moving average filter configured to receive the output of the summing circuit and generate an average output, a voter configured to generate a vote in response to the average output and a predetermined threshold, and, an accumulator and code generator configured to generate a code signal in response to the generated vote. By introducing the moving average filter and the voter, a quicker way to lock to the center or near center of an eye diagram may be obtained.

20 Claims, 9 Drawing Sheets

(56) References Cited

U.S. PATENT DOCUMENTS

| | | |
|---|---|---|
| 9,698,970 B1 | 7/2017 | Cho |
| 9,960,902 B1 | 5/2018 | Lin et al. |
| 10,038,545 B1 | 7/2018 | Wu et al. |
| 10,224,937 B1 | 3/2019 | Wu et al. |
| 10,256,968 B1 | 4/2019 | Wu et al. |
| 2014/0064351 A1* | 3/2014 | Hidaka ............. H04L 25/03057 375/232 |
| 2018/0287837 A1 | 10/2018 | Zhang et al. |

OTHER PUBLICATIONS

Arash Zargaran-Yazd, Design Techniques for High-Speed Low-Power Wireline Receivers, Jul. 2013, 175 pages, Vancouver, Canada.

Samuel Palermo, Sebastian Hoyos, Ayman Shafik, Ehsan Zhian Tabasy, Shengchang Cai, Shiva Kiran, Keytaek Lee, CMOS ADC-Based Receivers for High-Speed Electrical and Optical Links, IEEE Communications Magazine, 8 pages, Oct. 2016.

Jose E. Schutt-Aine, ECE 546 Lecture—27 Equalization, 42 pages, Illinois, 2018, [online], [retrieved on Apr. 25, 2019]. Retrieved from the Internet <https://www.coursehero.com/file/37912687/Lect-27 pdf/>.

John Baprawski, SerDes System CTLE Basics, 10 pages, Mar. 22, 2012, [online], [retrieved on Apr. 10, 2019]. Retrieved from the Internet <https://johnbaprawski.com/wp-content/uploads/2012/04/SerDes_System_CTLE_Basics.pdf>.

* cited by examiner

CONTINUOUS TIME LINEAR EQUALIZATION (CTLE) ADAPTATION ALGORITHM ENABLING BAUD-RATE CLOCK DATA RECOVERY(CDR) LOCKED TO CENTER OF EYE

TECHNICAL FIELD

Various embodiments relate generally to electronic circuits and in particular, to clock data recovery (CDR) circuit in a receiver.

BACKGROUND

Clock data recovery (CDR) circuit is an important block in a receiver system for high-speed serial communications. The CDR circuit may generate the correct sampling clock phase for data recovery. The quality of the high-speed serial communication link may be sensitive to the sampling dock phase, especially in the presence of jitter and noise.

In a receiver having a phase interpolator that determines a clock phase for sampling the incoming data, the CDR circuit may be used to identify if the currently used dock phase is the best to capture the incoming data. The CDR circuit may provide dynamic phase adjustments for the phase interpolator. The CDR circuit may operate to move the dock phase location towards the center of the data eye. The farther the current dock phase is from the center of the data eye the longer it takes for the CDR circuit to lock to the correct dock phase. Long locking times may lead to data loss.

One type of existing CDR circuit is an edge-sampled CDR circuit. An edge-sampled CDR circuit may oversample the analog input waveform to generate the correct data sampling dock and recover the transmitted data. The edge-sampled CDR circuit may assume the data to be sampled as around the center between Zero-crossing points. The resulting oversampled system may consume more clocking power than a system operating at the symbol rate (also referred to as baud-rate). Further, as the channel loss profile changes, the analog waveform to be sampled may be not necessarily symmetric. Thus, maintain the data sampling dock at the center between Zero-crossing points may be sub optimal.

SUMMARY

Apparatus and associated methods relate to adapting a continuous time linear equalization (CTLE) circuit with minimum mean square error baud-rate clock and data recovery circuit to be able to lock to the center or near center of an eye diagram. In an illustrative example, a circuit may include an inter-symbol interference (ISI) detector configured to receive data and error samples, a summing circuit coupled to the output of the ISI detector, a moving average filter configured to receive the output of the summing circuit and generate an average output, a voter configured to generate a vote in response to the average output and a predetermined threshold, and, an accumulator and code generator configured to generate a code signal in response to the generated vote. By introducing the moving average filter and the voter, a quicker way to lock to the center or near center of an eye diagram may be obtained.

Various embodiments may achieve one or more advantages. For example, in some embodiments, CTLE adaptation may control the precursor and postcursor inter-symbol interference (ISI) to relatively small amount instead of completely zeroing out the precursor and postcursor ISI. In some embodiment, instead of performing adaptation by considering one-bit data sample at a time, an average of 128-bit data samples may be calculated. Thus, CDR adaptation may be performed quicker. And the adaptation may live with a little amount of precursor and/or postcursor ISI. Thus, the CTLE with MMSE baud-rate CDR may be able to lock to the center or near the center of an eye diagram easily and quickly. Adaptation of the CTLE may be settled faster. In some embodiments, by making the locking point at the center or near the center of the eye diagram, substantially equal margin may be obtained, and the receiver may be provided sufficient margin to correctly sample bits. In some embodiments, a programmable threshold (e.g., user-defined value) may be received by the voter, different equalization performances may be obtained. Some embodiments may make the receiver to be able to live with a small amount of inter-symbol interferences (ISIs), nevertheless, the small amount of ISIs may be well controlled. In some embodiments, the using of CTLE adaptation may omit the usage of finite-impulse response (FIR), thus, power consumption of a Serializer/Deserializer (SerDes) systems may be reduced, if a small amount of ISI is allowed.

In one exemplary, a circuit includes (a) an inter-symbol interference (ISI) detector configured to receive data samples and error samples, (b) a summing circuit configured to receive the output of the ISI detector and generate an adaptation information signal, (c) a moving average filter configured to receive the adaptation information signal from the summing circuit and generate an average output, (d) a voter configured to generate a vote in response to the average output and a predetermined threshold, and (e) an accumulator and code generator configured to generate a code signal in response to the generated vote. an inter-symbol interference (ISI) detector configured to receive data samples and error samples;

In some embodiments, the ISI detector may be configured to operate according to a truth table of a first postcursor. In some embodiments, the ISI detector may be configured to operate according to a truth table of a first precursor. In some embodiments, the ISI detector may be configured to operate according to a truth table of a first precursor. In some embodiments, the voter may include a comparator, when the average output equals the predetermined threshold, the comparator is configured to generate zero. In some embodiments, when the average output is larger than the predetermined threshold, the comparator may be configured to generate a −1, 0, or +1 CTLE adaptation vote each adaptation cycle. In some embodiments, the accumulator and code generator may include a register. In some embodiments, the predetermined threshold may range from 3 to 4. In some embodiments, the bit width of data samples may be 128 bits. In some embodiments, the data samples may be derived from a transmitted signal using a data slicer at baud-rate. In some embodiments, the error samples may be derived from a transmitted signal using an error slicer at baud-rate.

In another exemplary, a method includes (a) providing an inter-symbol interference (ISI) detector to receive data samples and error samples, (b) configuring a summing circuit to receive the output of the ISI detector and generate an adaptation information signal, (c) configuring a moving average filter to receive the adaptation information signal from the summing circuit and generate an average output, (d) configuring a voter to generate a vote in response to the average output and a predetermined threshold, and, (e) providing an accumulator and code generator to generate a code signal in response to the generated vote.

In some embodiments, the ISI detector may be configured to operate according to a truth table of a first postcursor. In some embodiments, the ISI detector may be configured to operate according to a truth table of a first precursor. In some embodiments, the voter may include a comparator configured to compare the average output and the predetermined threshold, and when the average output equals the predetermined threshold, the comparator may be configured to generate zero. In some embodiments, when the average output is larger than the predetermined threshold, the comparator may be configured to generate a −1, 0, or +1 CTLE adaptation vote each adaptation clock cycle. In some embodiments, the accumulator and code generator may include a register. In some embodiments, the predetermined threshold may range from 3 to 4. In some embodiments, the bit width of data samples may be 128 bits. In some embodiments, the data samples may be derived from a transmitted signal using a data slicer at a baud-rate. In some embodiments, the error samples may be derived from a transmitted signal using an error slicer at a baud-rate.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Apparatus and associated methods relate to adapting a continuous time linear equalization (CTLE) circuit with minimum mean square error (MMSE) baud-rate clock and data recovery (CDR) circuit to be able to lock to the center or near center of an eye diagram. In an illustrative example, a circuit may include an inter-symbol interference (ISI) detector configured to receive data and error samples, a summing circuit coupled to the output of the ISI detector, a moving average filter configured to receive the output of the summing circuit and generate an average output, a voter configured to generate a vote in response to the average output and a predetermined threshold, and, an accumulator and code generator configured to generate a code signal in response to the generated vote. By introducing the moving average filter and the voter, a quicker way to lock to the center or near center of an eye diagram may be obtained.

To aid understanding, this document is organized as follows. First, an exemplary platform (e.g., an FPGA) suitable to perform data communication is briefly introduced with reference to FIG. 1. Second, with reference to FIGS. 2A-4, the discussion turns to exemplary embodiments that illustrate schematics of an adaptation circuit and methods to implement the adaptation circuit. Then, with reference to FIG. 5A-5C, exemplary simulation results of the performance of the adaptation circuit is discussed. Finally, with reference to FIG. 6, another exemplary platform (e.g., a system-on-Chip (SOC)) suitable to perform data communication and signal conversion is briefly introduced.

Figure 1:
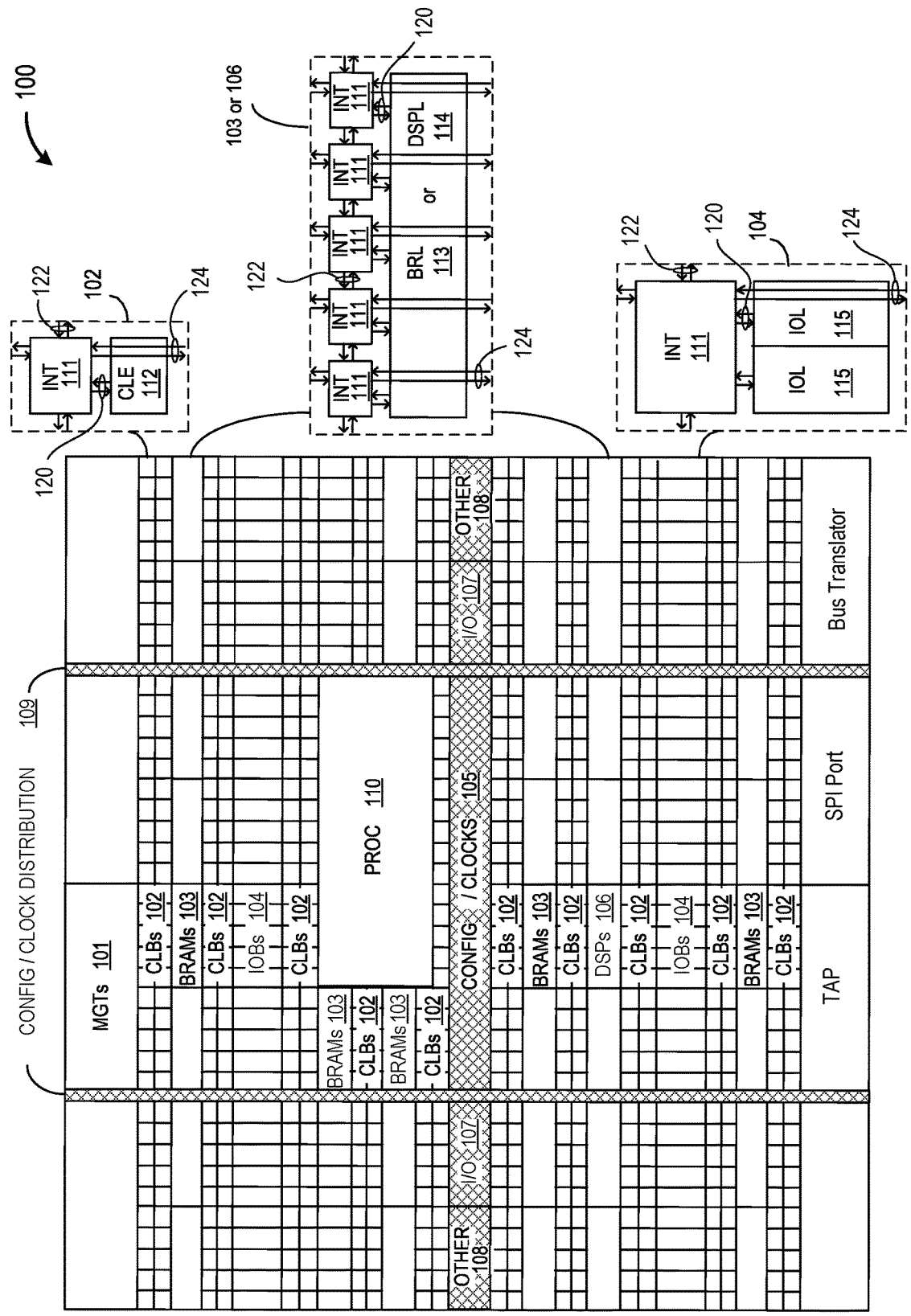
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An 1OB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

High speed digital (HSD) integrated circuits (ICs) may be used in Serializer/Deserializer (SerDes) systems. In such systems, a lossy channel may exist between the transmitter circuit and the receiver circuit and at high data rates the received data stream may be severely distorted and requires reconstruction (equalization) before use.

Figure 2A:
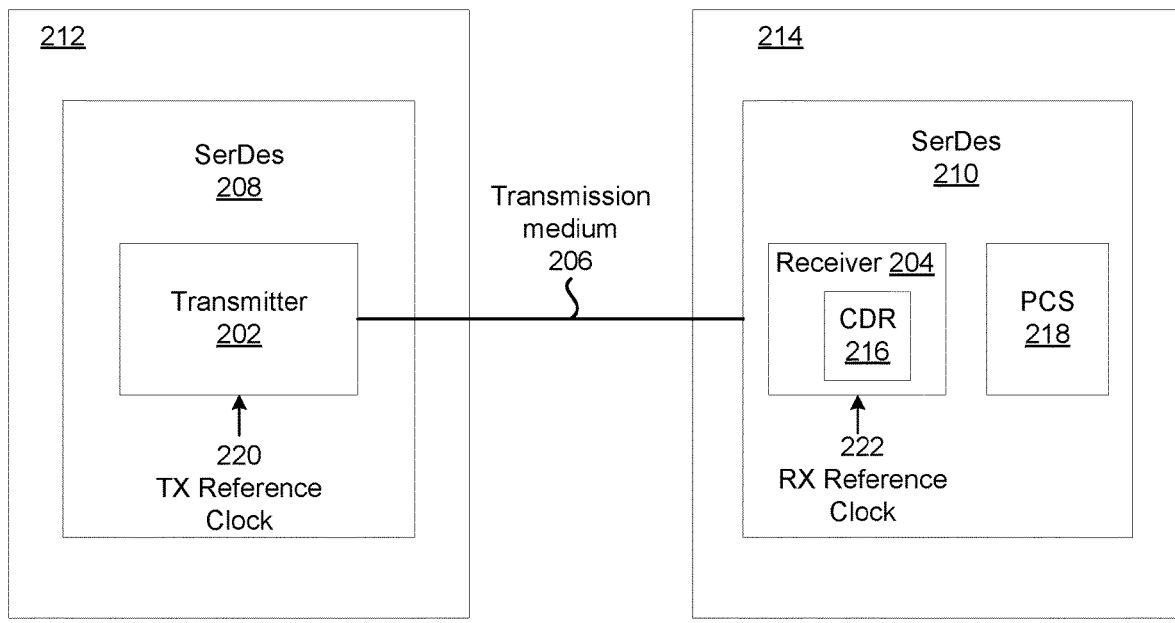
FIG. 2A depicts an exemplary communication system.

FIG. 2A depicts an exemplary communication system. In this depicted example, a serial communication system 200 includes a transmitter 202 coupled to a receiver 204 over transmission medium 206. The transmitter 202 may be part of a serializer-deserializer (SerDes) 208. The receiver 204 may also be part of a SerDes 210. The transmission medium 206 may include printed circuit board (PCB) traces, vias, cables, connectors, decoupling capacitors, and the like. In some embodiments, the SerDes 208 may be disposed in an integrated circuit (IC) 212, and the SerDes 210 may be disposed in an IC 214.

The transmitter 202 drives serial data onto the transmission medium 206 using a digital baseband modulation technique. In general, the serial data is divided into symbols. The transmitter 202 converts each symbol into an analog voltage mapped to the symbol. The transmitter 202 couples the analog voltage generated from each symbol to the transmission medium 206. In some embodiments, the transmitter 202 may use a binary non-return-to-zero (NRZ) modulation scheme. In binary NRZ, a symbol may be one bit of the serial data and two analog voltages may be used to represent each bit. In some examples, the transmitter 202 may use multi-level digital baseband modulation techniques, such as pulse amplitude modulation (PAM), where a symbol includes a plurality of bits of the serial data and more than two analog voltages may be used to represent each bit.

The receiver 204 may include a clock and data recovery (CDR) circuit 216. The receiver 204 receives an analog signal from the transmission medium 206. The transmission medium 206 may degrade the signal quality of the transmitted analog signal. Channel insertion loss is a frequency-dependent degradation in signal power of the analog signal. When signals travel through a transmission medium, the high frequency components of the analog signal may be attenuated more than the low frequency components. In general, channel insertion loss may increase as frequency increases. Signal pulse energy in the analog signal may be spread from one symbol period to another during propagation on the transmission medium 206. The resulting distortion is known as inter-symbol interference (ISI).

The CDR circuit 216 operates to recover data and a clock from the analog signal. The receiver 204 provides the recovered data to physical coding sublayer (PCS) circuitry 218 in SerDes 210 for decoding and further processing. As illustrated in FIG. 2A, the transmitter 202 may use a transmitter reference clock 220, and the receiver 204 may use a receiver reference clock 222. In some embodiments, there may be a difference between the transmitter reference clock 220 and the receiver reference clock 222, which may be referred to as a frequency offset between the transmitter reference clock and the receiver reference clock 222. A frequency reference offset may exist when the transmitter reference clock 220 and the receiver reference clock 222 use independent clock sources (e.g., clock sources that are nominally but not exactly identical in frequency). In some embodiments, the frequency offset may be fixed (e.g., equal to a constant). In some embodiments, the frequency offset may not be fixed, for example, may be a periodic function of time.

Figure 2B:
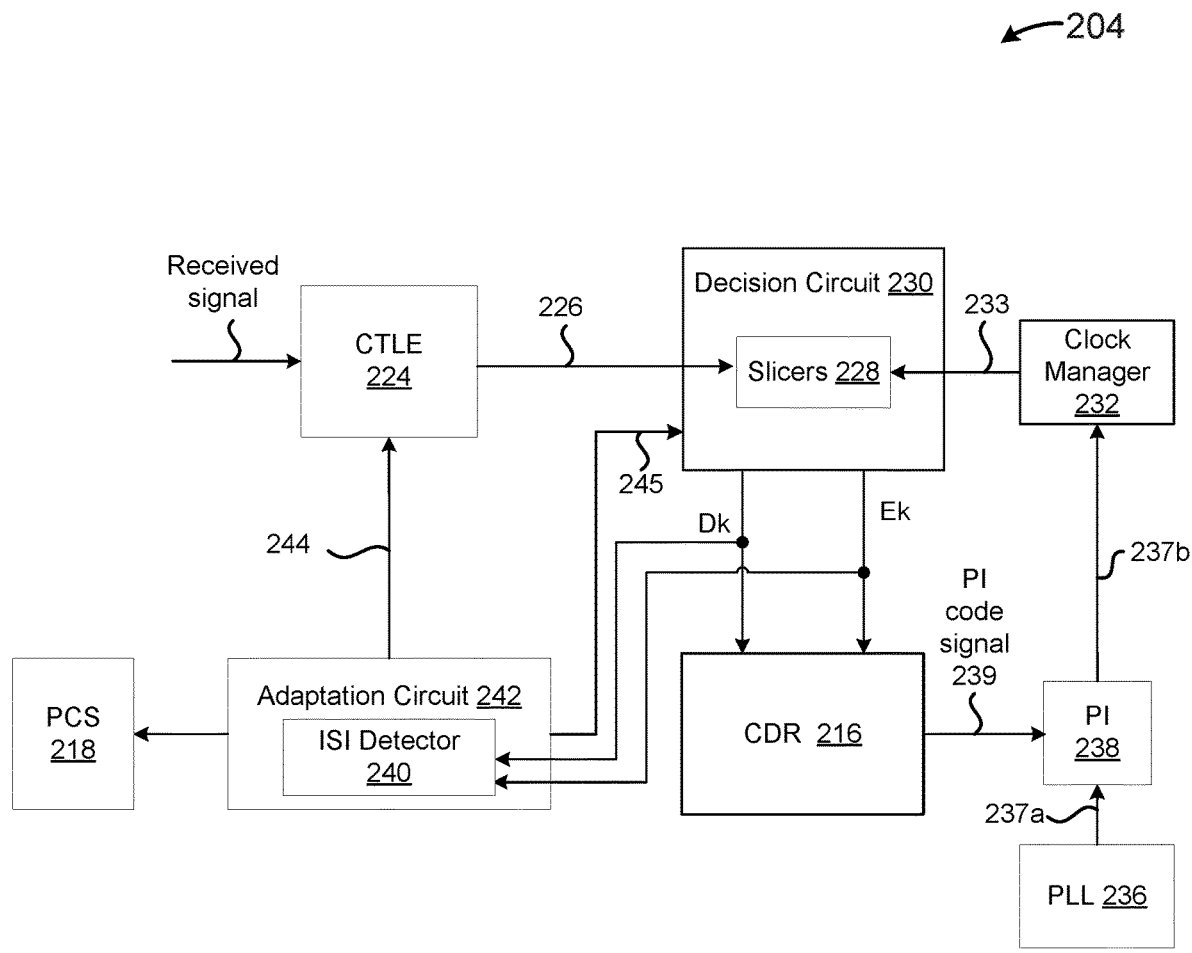
FIG. 2B depicts a block diagram of an exemplary receiver.

FIG. 2B depicts a block diagram of an exemplary receiver. The receiver 204 includes a continuous time linear equalizer (CTLE) 224. The CTLE 224 is coupled to receive the analog signal from the transmission medium 206. The CTLE 224 may operate as a high-pass filter or band-pass filter to compensate for the low-pass characteristics of the transmission medium 206. The peak of the frequency response of the CTLE 224 may be adjusted by an adaptation circuit 242.

The CTLE 224 outputs a first equalized analog signal 226. A decision circuit (e.g., decision feedback equalizer (DFE)) 230 is coupled to the output of the CTLE 224 and receives the first equalized analog signal 226. The decision circuit 230 may be operable to equalize the first equalized analog signal 226 to compensate for post-cursor ISI. In this depicted example, the decision circuit 230 also includes slicers 228. The slicers 228 samples the first equalized analog signal 226 to generate a data sample Dk and an error sample Ek per symbol k. Each of the slicers 228 may sample its analog input signal using a sampling clock at the baud-rate (symbol rate) to generate the data and error samples. The data samples Dk may include estimated values for the symbols, and the error samples Ek may include estimated decision errors for the symbols. Each data sample Dk and each error sample Ek may include one or more bits depending on the type of modulation scheme employed (e.g., one-bit samples for binary NRZ and multi-bit samples for PAM).

In some embodiments, the receiver 204 may also include a deserializer (not shown) to group data samples Dk and error samples Ek to generate a deserialized signal to be processed by the CDR circuit 216. A clock manager 232 may be configured to generate sampling clock signals 233 (e.g., data sampling clock and/or error sampling clock used by the slicers 228) from, for example, a sampling clock 237b output by a phase interpolator (PI) 238. Another input of the PI 238 is coupled to an output of a phase-locked loop (PLL) 236. In another example, the function of the clock manager 232 may be incorporated into the PI 238. The clock manager 232 may also reduce the frequency of the sampling clock 237b supplied by the PI 238.

The CDR circuit 216 is coupled to the outputs of the slicers 228 to receive the data samples Dk and error samples Ek. In this depicted example, the CDR circuit 216 generates a PI code signal 239 in response to the received data samples Dk and error samples Ek. The PI 238 receives a reference clock signal 237a from the PLL 236. The PI 238 may shift the phase of the reference clock signal 237a based on the PI code signal 239 output by the CDR circuit 216. The PI 238 may output the phase-shifted reference clock signal as the sampling clock signal 237b used by the slicers 228, for example. In some embodiments, the CDR circuit 216 may include a phase detector configured to receive the data samples Dk and error samples Ek to generate the PI code signal 239. In some embodiments, the slicers 228 may include separate data slicers and error slicers. In some embodiments, the slicers 228 may include, for example, four error slicers.

The data samples Dk and error samples Ek are also received by the adaptation circuit 242. In some embodiments, the adaptation circuit 242 may generate control signals 244 for the CTLE 224 and an adaptation control code 245 to adapt the decision circuit 230 based on the data samples Dk and the error samples Ek, using known algorithms.

In this depicted example, the adaptation circuit 242 includes an inter-symbol interference (ISI) detector 240. The ISI detector 240, coupled to receive the data samples Dk and error samples Ek, determines whether to adjust the data sampling clock signal 233 phase and in which direction the data sampling clock signal 233 phase should be adjusted. The adaptation circuit 242 also generates an adaptation control code 245 to adapt the decision circuit 230. In some embodiments, the CDR circuit 216 may operate in accordance with a minimum mean squared error (MMSE) algorithm. In some embodiments, the CDR circuit 216 may operate in accordance with a Mueller-Muller algorithm. An exemplary block diagram of the adaptation circuit 242 is described in detail with reference to FIG. 3.

In some embodiments, the receiver 204 may also include an automatic gain control (AGC) circuit. An output of the CTLE 224 may be coupled to an input of the AGC circuit. The AGC circuit may be used to control the gain of the high-pass filter. The gain of the AGC circuit may be also controlled by the adaptation circuit 242. In some embodiments, the AGC circuit may precede the CTLE circuit 224. In other examples, the receiver 204 may include other types of continuous-time filters with or without amplification. In some embodiments, different algorithms may be used to make the CTLE circuit 224 only look the first postcursor.

Figure 3:
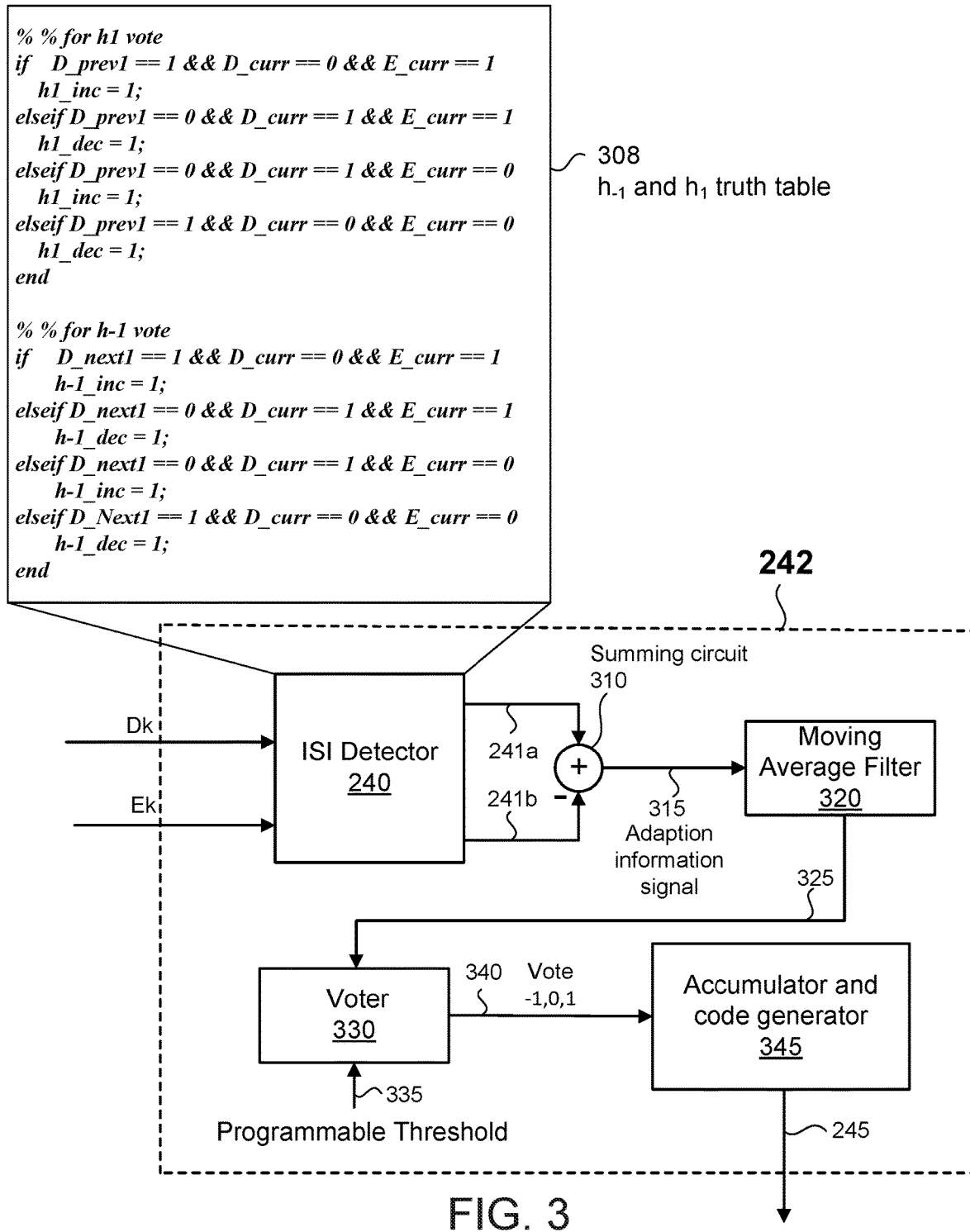
FIG. 3 depicts a block diagram of an exemplary adaptation circuit implemented in the receiver.

FIG. 3 depicts a block diagram of an exemplary adaptation circuit implemented in the receiver. In this depicted example, the adaptation circuit 242 includes the ISI detector 240. The data and error samples may be 128 bits. The ISI detector 240 receives the 128-bit data samples Dk (e.g., D(128)) and 128-bit error samples Ek (e.g., E(128)) and generates a phase detect result signal, and the phase detect result signal provides a net phase detect result. In this depicted example, the ISI detect result signal may be a incremental signal 241a to increment phase of the sampling clock signal 233 or may be a decremental signal 241b to decrement phase of the sampling clock signal 233 in response to the received data samples Dk and error samples Ek. The ISI detector 240 may operate according to the truth table 308 shown in FIG. 3. The true table 308 may be based on a first postcursor $h_1$ or a first precursor $h_{-1}$. In this depicted example, current data sample D_curr, next data sample D_next1, and current error sample E_curr are considered to determine whether to increment (e.g., $h_{-1}$_inc) or decrement (e.g., $h_{-1}$_dec) the phase of the sampling clock signal 233.

The adaptation circuit 242 includes a summing circuit 310. The summing circuit 310 receives, for example, the incremental signal 241a and the decremental signal 241b from the ISI detector 240 and generates a adaptation information signal 315 to a moving average filter 320. In this depicted example, as the data samples Dk and error samples Ek may be 128 bits, the moving average filter 320 may receive a 128-bit $h_{-1}$ adaptation information at a time and then generate an average signal 325 of the $h_{-1}$ adaptation information signal 315. Different mathematic algorithms may be used to configure the moving average filter 320 to obtain the average signal 325. In some embodiments, the moving average filter 320 may be a weighted moving average filter. In some embodiments, the moving average filter 320 may be a cumulative moving average filter. In some embodiments, the moving average filter 320 may be an exponential moving average filter. Other weighting systems may also be used to configure the moving average filter 320 to obtain the average signal 325.

The average signal 325 is received by a voter 330. The voter 330 is also configured to receive a predetermined value 335 and generates a vote signal 340 in response to the received average signal 325 and the predetermined value 335. In this depicted example, the predetermined value 335 may be a programmable threshold that indicates an acceptable moving-averaged step size. By introducing a programmable threshold (e.g., user-defined values), different equalization performances/results may be obtained. In some embodiments, the voter may include one or more comparators configured to indicate the relationship between the average signal 325 and the predetermined value 335. In some embodiments, the programmable threshold may range from 1 to 10, for example, 3~4. In addition, the window boundary of the predetermined value may be scaled by considering different design requirements, for example, the valid number of error slicers and data slicers in the decision circuit 230 and/or the bus width.

When the average signal 325 is greater than the predetermined value (e.g., 3) 335, the voter 330 may generate a −1, 0, or +1 CTLE adaptation vote each adaptation clock cycle. If the average signal 325 is less than the predetermined value 335, the voter 330 may generate a digital 0. If the average signal 325 is equal to the predetermined value 335, the voter 330 may generate a digital −1. An accumulator and code generator 345 is configured to accumulate the vote signal 340 included in the output of the voter 330 and outputs the adaptation control code signal 245 (e.g., 32-bit signal) to control the DFE adaptation. In some embodiments, the accumulator and code generator 345 may include one or more registers. By introducing the moving average filter 320 and the voter 330, CTLE adaptation may control the precursor and postcursor 151 to relatively small amount instead of completely zeroing out the precursor and postcursor ISI. And the adaptation may live with a little amount of precursor and/or postcursor 151. Thus, the CTLE 224 with MMSE baud-rate CDR 216 may be able to lock to the center or near the center of an eye diagram easily and quickly. In addition, adaptation may be settled faster.

Figure 4:
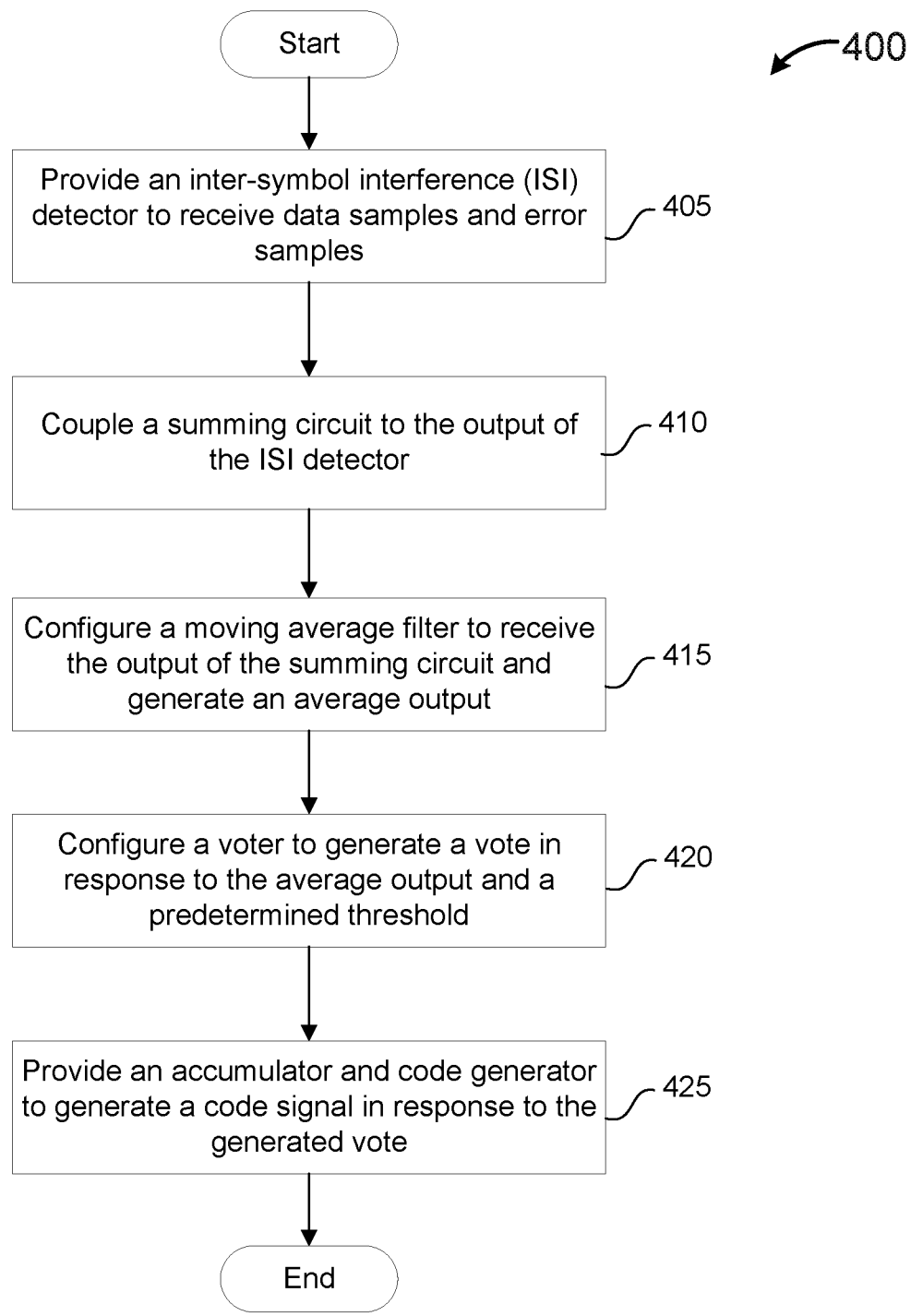
FIG. 4 depicts a flow chart of an exemplary method to implement adaptation circuit in FIG. 3.

FIG. 4 depicts a flow chart of an exemplary method to implement the adaptation circuit in FIG. 3. A method 400 to implement the adaptation circuit 242 described with reference to FIG. 3 is discussed. The method 400 includes, at 405, providing an inter-symbol interference (ISI) detector (e.g., the ISI detector 240) to receive data samples and error samples, for example, from a decision circuit (e.g., the decision circuit 230 that includes slicers 228). The method 400 also includes, at 410, coupling a summing circuit (e.g., the summing circuit 310) to the output of the ISI detector 240.

The method 400 also includes, at 415, configuring a moving average filter (e.g., the moving average filter 320) to receive the output of the summing circuit 310 and generate an average output (e.g., the average signal 325). The method 400 also includes, at 420, configuring a voter (e.g., the voter 330) to generate a vote (e.g., vote signal 340) in response to the average output 325 and a predetermined threshold 335. The method 400 also includes, at 425, providing an accumulator and code generator (e.g., the accumulator and code generator 345) to generate a code signal in response to the generated vote 340. By introducing the moving average filter 320 and the voter 330, CTLE adaptation may control the precursor and postcursor ISI to relatively small amount instead of completely zeroing out the precursor and postcursor ISI. And the adaptation may live with a little amount of precursor and/or postcursor ISI. Thus, the CTLE 224 with MMSE baud-rate CDR 216 may be able to lock to the center or near the center of an eye diagram easily and quickly.

Figure 5A:
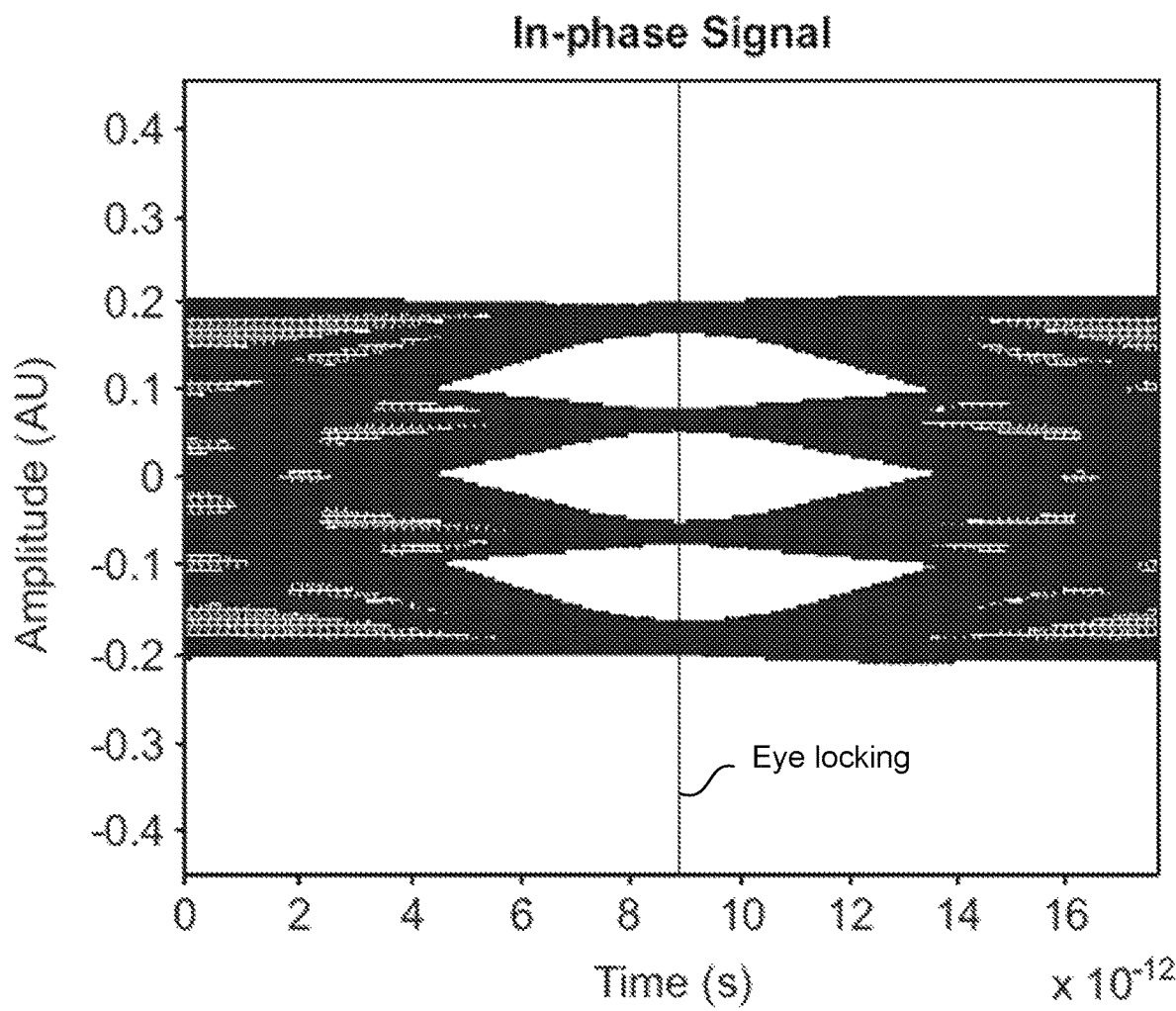
FIG. 5A depicts a simulated eye diagram.

FIG. 5A depicts a simulated eye diagram. The adaptation circuit 242 described with reference to FIG. 3 has been implemented in system model and simulated. The result in terms of eye diagram with locking point marked is shown in FIG. 5A. As shown in FIG. 5A, the eye locking (by, for example, MMSE baud-rate CDR) is centered. By making the locking point at the center or near the center of the eye diagram, substantially equal margin may be obtained, and the receiver 204 may be provided sufficient margin to correctly sample bits.

Figure 5B:
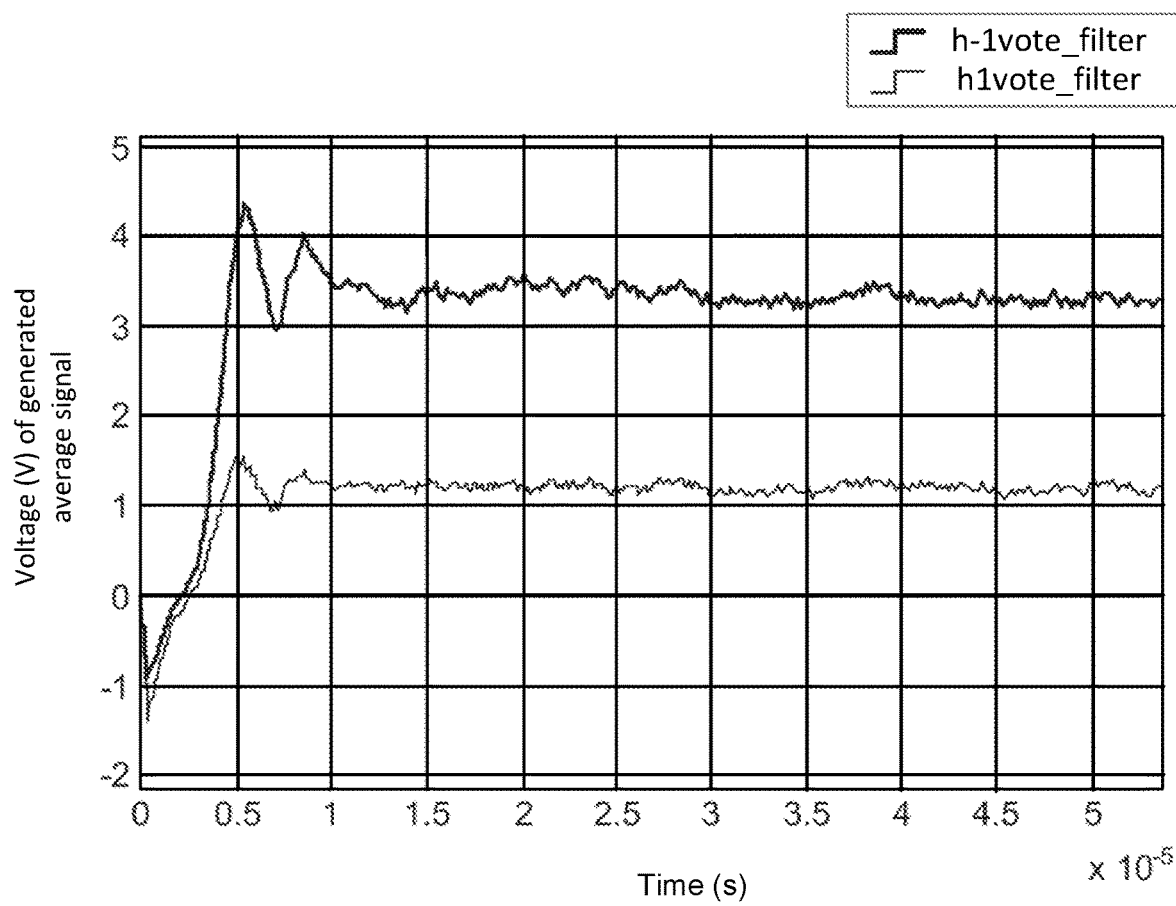
FIG. 5B depicts a simulated result of the output of a moving average filter used in the adaptation circuit.

FIG. 5B depicts a simulated result of the output of a moving average filter used in the adaptation circuit. In this figure, simulation results of the output of the moving average filter 320 used in the adaptation circuit 242 are shown. The output (e.g., the average signal 325) of the moving average filter 320 has been adjusted by the CTLE 224 into the window range of 3~4 The average signal 325 may be a $h_{-1}$ vote filter or a $h_1$ vote filter which may be decided by a user, for example. An average signal generated based on the first postcursor $h_1$ and an average signal generated based on the first precursor $h_{-1}$ are simulated and shown. The receiver may be able to live with a small amount of inter-symbol interferences (ISIs).

Figure 5C:
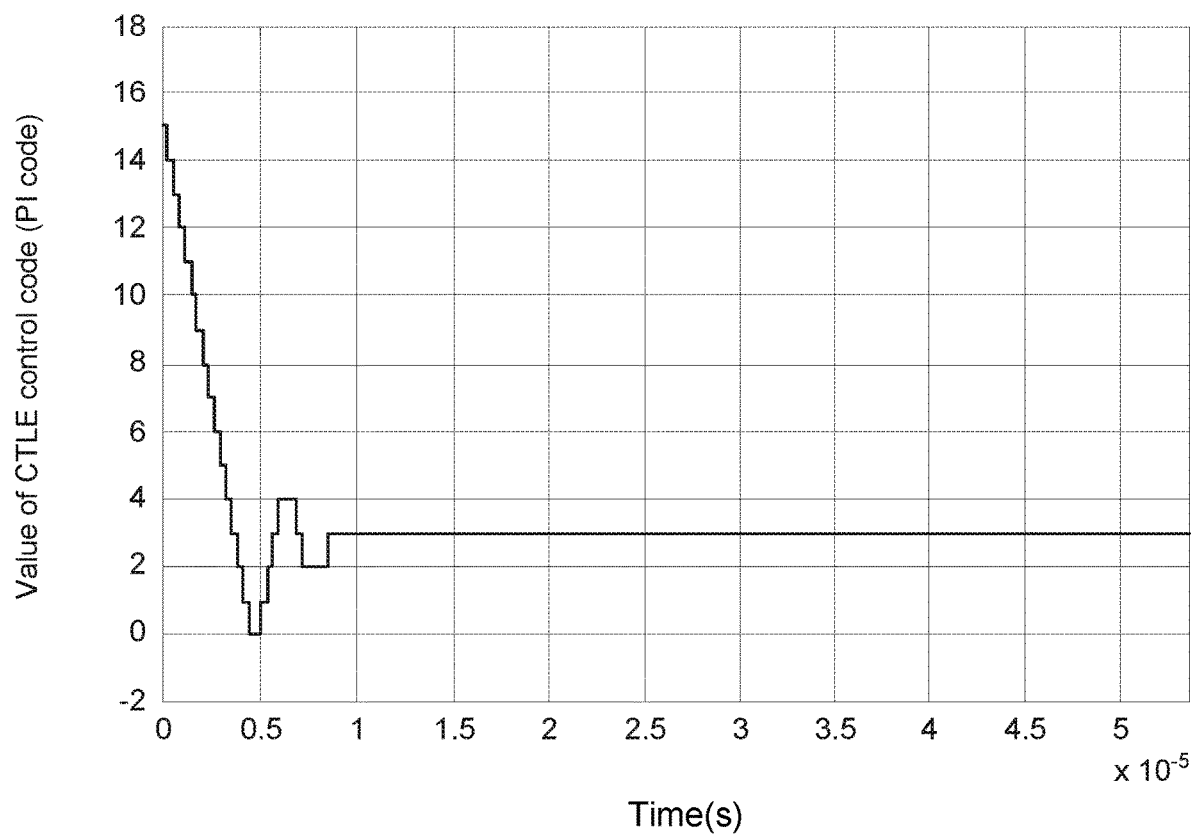
FIG. 5C depicts a waveform of settling behavior of a CTLE in the receiver.

FIG. 5C depicts a waveform of settling behavior of a CTLE in the receiver. The settling behavior of the CTLE 224 in the receiver 204 is simulated. As shown in tie FIG. 5C, the CTLE control code is be settled to a certain value within the control range 0~31. By introducing the moving average filter and the voter, a quicker way to lock to the center or near center of an eye diagram may be obtained.

In this depicted example, the adaptation circuit 242 is arranged on the same IC with the receiver 204 and the CTLE 224. In another embodiment, the adaptation circuit 242 may be implemented in a different IC (e.g., another FPGA) to control the equalization.

In some embodiments, the adaptation circuit 242 may be implemented as hard block fixed circuitry. For example, an application specific integrated circuit (ASIC) may provide an adaptation circuit for generating adaptation code signal with customized hardware circuitry.

In some embodiments, some or all of the functions of the adaptation circuit 242 may be implemented in a processor that is configured to execute a set of instructions stored in a data store to control the equalization. For example, the function of voter 330 may be implemented in the processor. In some embodiments, the processor may be arranged on the same integrated circuit, which may be an FPGA with the receiver 204. For example, the adaptation circuit 242 and the data store may be implemented in a programmable logic block of a system-on-chip (SOC) or implemented in a hard block using fixed circuitry of the SOC, and the receiver 204 may be implemented in another hard block using, for example, fixed circuitry of the SOC.

Figure 6:
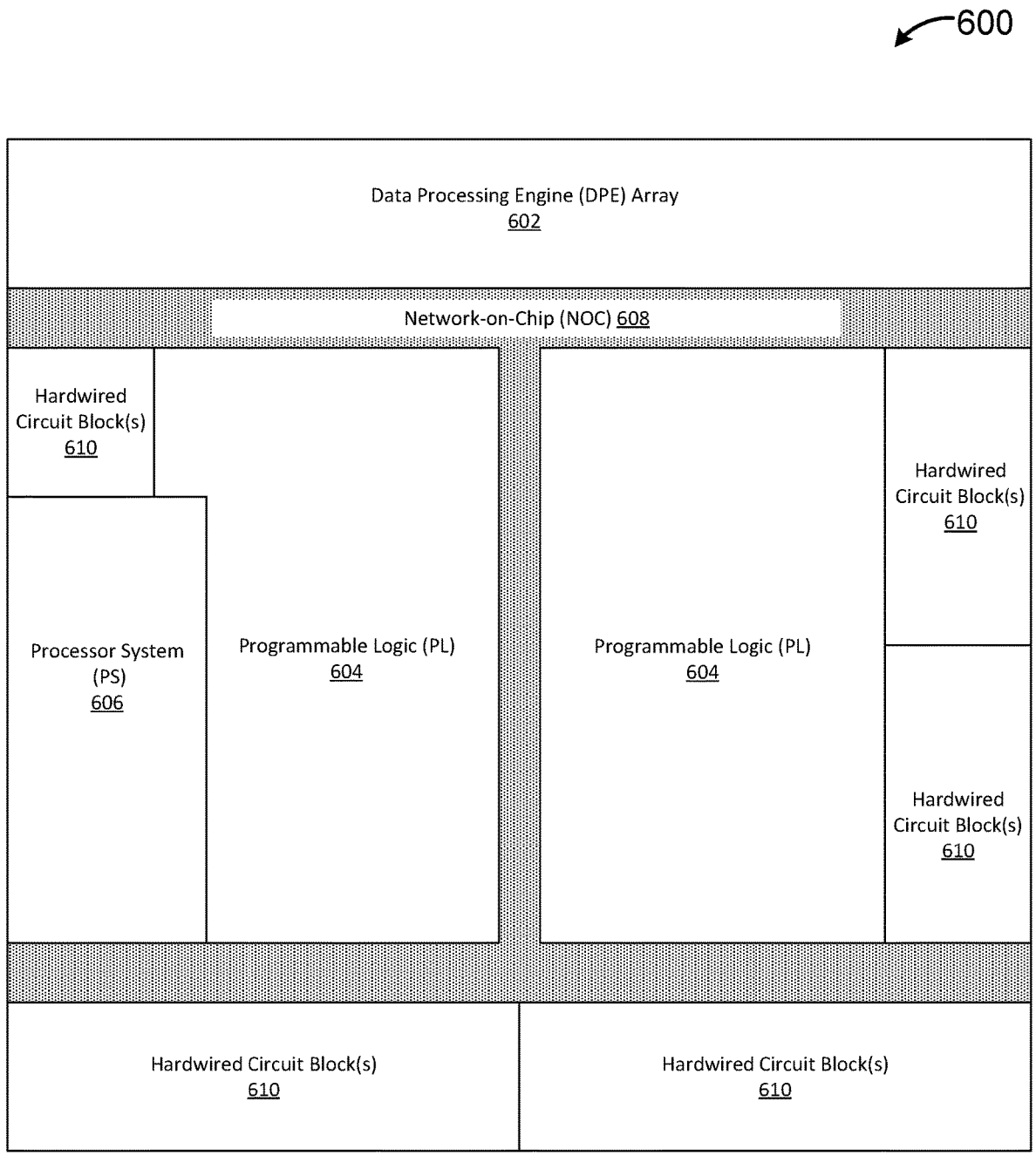
FIG. 6 depicts an exemplary architecture for a System-on-Chip (SOC) type of integrated circuit (IC).

FIG. 6 depicts an exemplary architecture for a System-on-Chip (SOC) type of integrated circuit (IC). SOC 600 is an example of a programmable IC and an integrated programmable device platform. In the example of FIG. 6, the various, different subsystems or regions of the SOC 600 illustrated may be implemented on a single die provided within a single integrated package. In other examples, the different subsystems may be implemented on a plurality of interconnected dies provided as a single, integrated package.

In the example, the SOC 600 includes a plurality of regions having circuitry with different functionalities. In the example, the SOC 600 optionally includes a data processing engine (DPE) array 602. SOC 600 includes programmable logic (PL) regions 604 (hereafter PL region(s) or PL), a processing system (PS) 606, a Network-on-Chip (NOC) 608, and one or more hardwired circuit blocks 610. DPE array 602 is implemented as a plurality of interconnected, hardwired, and programmable processors having an interface to the other regions of the SOC 600.

PL 604 is circuitry that may be programmed to perform specified functions. As an example, PL 604 may be implemented as field programmable gate array type of circuitry. PL 604 can include an array of programmable circuit blocks. Examples of programmable circuit blocks within PL 604 include, but are not limited to, configurable logic blocks (CLBs), dedicated random access memory blocks (BRAM and/or UltraRAM or URAM), digital signal processing blocks (DSPs), clock managers, and/or delay lock loops (DLLs).

Each programmable circuit block within PL 604 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

The PS 606 is implemented as hardwired circuitry that is fabricated as part of the SOC 600. The PS 606 may be implemented as, or include, any of a variety of different processor types each capable of executing program code. For example, PS 606 may be implemented as an individual processor, e.g., a single core capable of executing program code. In another example, PS 606 may be implemented as a multicore processor. In still another example, PS 606 may include one or more cores, modules, co-processors, interfaces, and/or other resources. PS 606 may be implemented using any of a variety of different types of architectures. Example architectures that may be used to implement PS 606 may include, but are not limited to, an ARM processor architecture, an x86 processor architecture, a GPU architecture, a mobile processor architecture, a DSP architecture, or other suitable architecture that is capable of executing computer-readable instructions or program code.

NOC 608 includes an interconnecting network for sharing data between endpoint circuits in SOC 600. The endpoint circuits can be disposed in DPE array 602, PL regions 604, PS 606, and/or in hardwired circuit blocks 610. NOC 608 can include high-speed data paths with dedicated switching. In an example, NOC 608 includes horizontal paths, vertical paths, or both horizontal and vertical paths. The arrangement and number of regions shown in FIG. 6 is merely an example. The NOC 608 is an example of the common infrastructure that is available within the SOC 600 to connect selected components and/or subsystems.

NOC 608 provides connectivity to PL 604, PS 606, and to selected ones of the hardwired circuit blocks 610. NOC 608 is programmable. In the case of a programmable NOC used with other programmable circuitry, the nets that are to be routed through NOC 608 are unknown until a user circuit design is created for implementation within the SOC 600. NOC 608 may be programmed by loading configuration data into internal configuration registers that define how elements within NOC 608 such as switches and interfaces are configured and operate to pass data from switch to switch and among the NOC interfaces.

NOC 608 is fabricated as part of the SOC 600 and while not physically modifiable, may be programmed to establish connectivity between different master circuits and different slave circuits of a user circuit design. NOC 608, for example, may include a plurality of programmable switches that are capable of establishing packet switched network connecting user specified master circuits and slave circuits. In this regard, NOC 608 is capable of adapting to different circuit designs, where each different circuit design has different combinations of master circuits and slave circuits implemented at different locations in the SOC 600 that may be coupled by NOC 608. NOC 608 may be programmed to route data, e.g., application data and/or configuration data, among the master and slave circuits of the user circuit design. For example, NOC 608 may be programmed to couple different user-specified circuitry implemented within PL 604 with PS 606, and/or DPE array 602, with different hardwired circuit blocks, and/or with different circuits and/or systems external to the SOC 600.

The hardwired circuit blocks 610 may include input/output (I/O) blocks, and/or transceivers for sending and receiving signals to circuits and/or systems external to SOC 600, memory controllers, or the like. Examples of different I/O blocks may include single-ended and pseudo differential I/Os and high-speed differentially clocked transceivers. Further, the hardwired circuit blocks 610 may be implemented to perform specific functions. Examples of hardwired circuit blocks 610 include, but are not limited to, cryptographic engines, digital-to-analog converters, analog-to-digital converters, and the like. The hardwired circuit blocks 610 within the SOC 600 may be referred to herein from time-to-time as application-specific blocks.

In the example of FIG. 6, PL 604 is shown in two separate regions. In another example, PL 604 may be implemented as a unified region of programmable circuitry. In still another example, PL 604 may be implemented as more than two different regions of programmable circuitry. The particular organization of PL 604 is not intended as a limitation. In this regard, SOC 600 includes one or more PL regions 604, PS 606, and NOC 608. DPE array 602 may be optionally included.

In other example implementations, the SOC 600 may include two or more DPE arrays 602 located in different regions of the IC. In still other examples, the SOC 600 may be implemented as a multi-die IC. In that case, each subsystem may be implemented on a different die. The different dies may be communicatively linked using any of a variety of available multi-die IC technologies such stacking the dies side-by-side on an interposer, using a stacked-die architecture where the IC is implemented as a Multi-Chip Module (MCM), or the like. In the multi-die IC example, it should be appreciated that each die may include single subsystem, two or more subsystems, a subsystem and another partial subsystem, or any combination thereof.

A programmable integrated circuit (IC) refers to a type of device that includes programmable logic. An example of a programmable device or IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs). Modern programmable ICs have evolved to include programmable logic in combination with one or more other subsystems. For example, some programmable ICs have evolved into System-on-Chips or "SOCs" that include both programmable logic and a hardwired processor. Other varieties of programmable ICs include additional and/or different subsystems.

Although various embodiments have been described with reference to the figures, other embodiments are possible. For example, in some embodiments, other precursor and/or postcursor, instead of the first precursor and the first postcursor may be used to generate inputs for the moving average filter. For example, the moving average filter and voter may be extended to any other field using the MMSE algorithms for adaptation.

Various examples may be implemented using circuitry, including various electronic hardware. By way of example and not limitation, the hardware may include transistors, resistors, capacitors, switches, integrated circuits and/or other devices. In various examples, the circuits may include analog and/or digital logic, discrete components, traces and/or memory circuits fabricated on a silicon substrate including various integrated circuits (e.g., FPGAs, ASICs). In some embodiments, the circuits may involve execution of preprogrammed instructions and/or software executed by a processor. For example, various systems may involve both hardware and software.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a fixed hardware processor; and methods can be performed by a programmable processor executing a program of instructions to perform functions of various embodiments by operating on input data and generating an output. Some embodiments may be implemented advantageously in one or more computer programs that are executable on a programmable system including at least one processor coupled to receive data and instructions from, and to transmit data and instructions to, a data store, at least one input, and/or at least one output. A data store may include one or more registers or memory locations in, for example, a memory space. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other units suitable for use in a computing environment.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A circuit comprising:
an inter-symbol interference (ISI) detector configured to receive data samples and error samples;
a summing circuit configured to receive the output of the ISI detector and generate an adaptation information signal;
a moving average filter configured to receive the adaptation information signal from the summing circuit and generate an average output;
a voter configured to generate a vote in response to the average output and a predetermined threshold; and,
an accumulator and code generator configured to generate an adaptation code signal in response to the generated vote.

2. The circuit of claim 1, wherein the ISI detector is configured to operate according to a truth table of a first postcursor.

3. The circuit of claim 1, wherein the ISI detector is configured to operate according to a truth table of a first precursor.

4. The circuit of claim 1, wherein the voter comprises a comparator, when the average output equals the predetermined threshold, the comparator is configured to generate zero.

5. The circuit of claim 4, wherein when the average output is larger than the predetermined threshold, the comparator is configured to generate a continuous time linear equalization (CTLE) adaptation vote each adaptation clock cycle.

6. The circuit of claim 1, wherein the accumulator and code generator comprises a register.

7. The circuit of claim 1, wherein the predetermined threshold ranges from 3 to 4.

8. The circuit of claim 1, wherein the bit width of the data samples is 128 bits.

9. The circuit of claim 1, wherein the data samples are derived from a transmitted signal using a data slicer at a baud-rate.

10. The circuit of claim 1, wherein the error samples are derived from a transmitted signal using an error slicer at a baud-rate.

11. A method comprising:
providing an inter-symbol interference (ISI) detector to receive data samples and error samples;
configuring a summing circuit to receive the output of the ISI detector and generate an adaptation information signal;
configuring a moving average filter to generate an average output in response to the adaptation information signal;
configuring a voter to generate a vote in response to the average output and a predetermined threshold; and,
providing an accumulator and code generator to generate an adaptation code signal in response to the generated vote.

12. The method of claim 11, wherein the ISI detector is configured to operate according to a truth table of a first postcursor.

13. The method of claim 11, wherein the ISI detector is configured to operate according to a truth table of a first precursor.

14. The method of claim 11, wherein the voter comprises a comparator configured to compare the average output and the predetermined threshold, and when the average output equals the predetermined threshold, the comparator is configured to generate zero.

15. The method of claim 14, wherein when the average output is larger than the predetermined threshold, the comparator is configured to generate a continuous time linear equalization (CTLE) adaptation vote each adaptation clock cycle.

16. The method of claim 11, wherein the accumulator and code generator comprises a register.

17. The method of claim 11, wherein the predetermined threshold ranges from 3 to 4.

18. The method of claim 11, wherein the bit width of the data samples is 128 bits.

19. The method of claim 11, wherein the data samples are derived from a transmitted signal using a data slicer at a baud-rate.

20. The method of claim 11, wherein the error samples are derived from a transmitted signal using an error slicer at a baud-rate.

* * * * *